United States Patent
Kawamura et al.

(10) Patent No.: US 12,379,478 B2
(45) Date of Patent: Aug. 5, 2025

(54) SYSTEM FOR DETECTING OCCUPANT BEING LEFT IN VEHICLE

(71) Applicant: SUBARU CORPORATION, Tokyo (JP)

(72) Inventors: Kousei Kawamura, Tokyo (JP); Tomoya Kanagawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 459 days.

(21) Appl. No.: 17/744,983

(22) Filed: May 16, 2022

(65) Prior Publication Data

US 2022/0381894 A1    Dec. 1, 2022

(30) Foreign Application Priority Data

May 28, 2021   (JP) .................. 2021-089851

(51) Int. Cl.
  *G01S 13/04*   (2006.01)
  *G01S 13/48*   (2006.01)
  (Continued)

(52) U.S. Cl.
  CPC .................... *G01S 13/04* (2013.01)

(58) Field of Classification Search
  CPC .......... G01S 13/04; G01S 7/415; G01S 13/48; G01S 13/003; G01S 13/56; G01S 2013/9316; G01S 13/931; G01S 13/765; B60Q 9/004; B60R 22/48; B60R 16/03; B60R 2021/01088; B60R 2022/4816;
  (Continued)

(56) References Cited

U.S. PATENT DOCUMENTS 9,630,496 B2 *   4/2017   Cuddihy .............. B60W 50/14
9,865,150 B2 *   1/2018   Branković ............ G01S 7/03
(Continued)

FOREIGN PATENT DOCUMENTS

JP   2004-522932 A   7/2004
JP   2012-002527 A   1/2012
(Continued)

OTHER PUBLICATIONS

Office Action dated Jan. 28, 2025, from corresponding Japanese patent application No. 2021-089851, 3 pages.

*Primary Examiner* — Vladimir Magloire
*Assistant Examiner* — Remash R Guyah
(74) *Attorney, Agent, or Firm* — Rimon P.C.

(57) ABSTRACT

A system to detect an occupant left in a vehicle includes a sensor, a determiner, and a controller. The sensor outputs a radio wave and detects a wave reflected by the occupant being left in the compartment. The determiner determines whether the occupant is left in the compartment, at least based on a detection result from the detected reflected wave. The controller selects a radio wave to be output from the sensor from those of different frequencies including a first radio wave a second radio wave lower in frequency than the first radio wave. The controller is configured to switch from the first radio wave to the second radio wave when the occupant is leaving the vehicle, and cause the determiner to determine whether the occupant is left, based on a detection result from the reflected wave detected by the sensor which output the second radio wave.

13 Claims, 5 Drawing Sheets

(51) Int. Cl.
 *G01S 13/56* (2006.01)
 *B60R 16/03* (2006.01)
 *B60R 22/48* (2006.01)

(58) Field of Classification Search
 CPC ........ B60R 21/01546; B60R 21/01534; B60R 16/02; B60R 2022/4866; B60R 21/0153; B60R 21/015; B60H 1/00742; B60N 2/56; B60N 2/002; B60N 2230/20; B60N 2210/16; B60N 2/0022; B60N 2/0026; B60N 2/0028; G01V 3/12
 USPC ........................................................... 342/27
 See application file for complete search history.

(56) References Cited

U.S. PATENT DOCUMENTS

| | | | |
|---|---|---|---|
| 11,789,136 B2* | 10/2023 | Mazur | G01S 13/87 342/27 |
| 11,801,774 B2* | 10/2023 | Lu-Dac | A61B 5/0507 |
| 2002/0080014 A1* | 6/2002 | McCarthy | B60R 21/0154 340/561 |
| 2002/0082756 A1 | 6/2002 | Breed et al. | |
| 2003/0201894 A1* | 10/2003 | Li | B60N 2/0029 340/457 |
| 2006/0273917 A1* | 12/2006 | Rams, Jr. | B60N 2/274 340/667 |
| 2010/0094508 A1 | 4/2010 | Kozyreff et al. | |
| 2011/0074565 A1* | 3/2011 | Cuddihy | B60N 2/0035 340/457 |
| 2011/0121996 A1 | 5/2011 | Griffin et al. | |
| 2015/0129343 A1* | 5/2015 | Teng | B60N 2/0022 180/271 |
| 2018/0081048 A1* | 3/2018 | Saitou | G01S 13/46 |
| 2019/0126779 A1* | 5/2019 | Saitou | G01S 13/003 |
| 2020/0172049 A1* | 6/2020 | Scheele | B60R 16/03 |
| 2020/0292686 A1* | 9/2020 | Murata | B60N 2/0026 |
| 2021/0221258 A1* | 7/2021 | Ekchian | B60N 2/42 |

FOREIGN PATENT DOCUMENTS

| | | |
|---|---|---|
| JP | 2012-506052 A | 3/2012 |
| JP | 2020-101415 A | 7/2020 |
| JP | 2020-136748 A | 8/2020 |
| JP | 2020-142718 A | 9/2020 |
| WO | 2015-140333 A1 | 9/2015 |

* cited by examiner

SYSTEM FOR DETECTING OCCUPANT BEING LEFT IN VEHICLE

CROSS-REFERENCE TO RELATED APPLICATIONS

The present application claims priority from Japanese Patent Application No. 2021-089851 filed on May 28, 2021, the entire contents of which are hereby incorporated by reference.

BACKGROUND

The disclosure relates to a system for detecting an occupant being left in a vehicle.

In a vehicle, such as an automobile, occupants including a driver sit in seats in a vehicle compartment of the vehicle, and the vehicle runs by the driving operation of the driver, driving support, or autonomous driving. As a power source of a vehicle, an internal combustion engine that generates power by the combustion of a fuel such as gasoline or ethanol may be used, and other power sources, such as an electric motor using stored electricity and a power source using hydrogen, are also being developed.

In a vehicle, such as an automobile, it may be possible to monitor occupants in the vehicle compartment while the vehicle is driving and to execute control processing for making an emergency call in case of an emergency.

In a vehicle, such as an automobile, it may also be possible to output an alert about a child or an object being left in the vehicle after an adult, such as a driver, has left the vehicle. Japanese Unexamined Patent Application Publication (JP-A) Nos. 2020-101415 and 2020-142718 disclose that millimeter radio waves can be used to detect an occupant or an object being left in a vehicle.

SUMMARY

An aspect of the disclosure provides a system configured to detect an occupant being left in a vehicle. The system includes a sensor, a determiner, and a controller. The sensor is configured to output a radio wave toward a vehicle compartment of the vehicle and to detect a reflected wave generated as a result of the occupant being left in the vehicle compartment reflecting the radio wave output from the sensor. The determiner is capable of determining whether the occupant is being left in the vehicle compartment, at least based on a detection result obtained from the reflected wave detected by the sensor. The controller is capable of selecting the radio wave to be output from the sensor from radio waves of different frequencies including a first radio wave and a second radio wave. The second radio wave is lower in frequency than the first radio wave. The controller is configured to, in a case where a condition is met, switch the radio wave to be output from the sensor from the first radio wave to the second radio wave, and cause the determiner to determine whether the occupant is being left in the vehicle compartment based on the detection result obtained from the reflected wave detected by the sensor that has output the second radio wave. The condition includes one or more occupants being leaving the vehicle.

An aspect of the disclosure provides a system configured to detect an occupant being left in a vehicle. The system includes a sensor and circuitry. The sensor is configured to output a radio wave toward a vehicle compartment of the vehicle and to detect a reflected wave generated as a result of an occupant being left in the vehicle compartment reflecting the radio wave output from the sensor. The circuitry is configured to determine whether the occupant is being left in the vehicle compartment, at least based on a detection result obtained from the reflected wave detected by the sensor. The circuitry is configured to select the radio wave to be output from the sensor from radio waves of different frequencies including a first radio wave and a second radio wave. The second radio wave is lower in frequency than the first radio wave. The circuitry is configured to, in a case where a condition is met, switch the radio wave to be output from the sensor from the first radio wave to the second radio wave, and determine whether the occupant is being left in the vehicle compartment, based on the detection result obtained from the reflected wave detected by the sensor which has output the second radio wave. The condition includes one or more occupants being leaving the vehicle.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

In the technologies disclosed in JP-A Nos. 2020-101415 and 2020-142718, a sensor for outputting millimeter radio waves and detecting reflected waves is provided in each seat of a vehicle. With these technologies, in a vehicle, such as an automobile, including plural seats, the same number of sensors as that of the seats are disposed in the vehicle compartment. This may raise the cost and also limit the arrangement of devices disposed in the vehicle compartment of the vehicle.

It is thus desirable to address the above-described issue.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
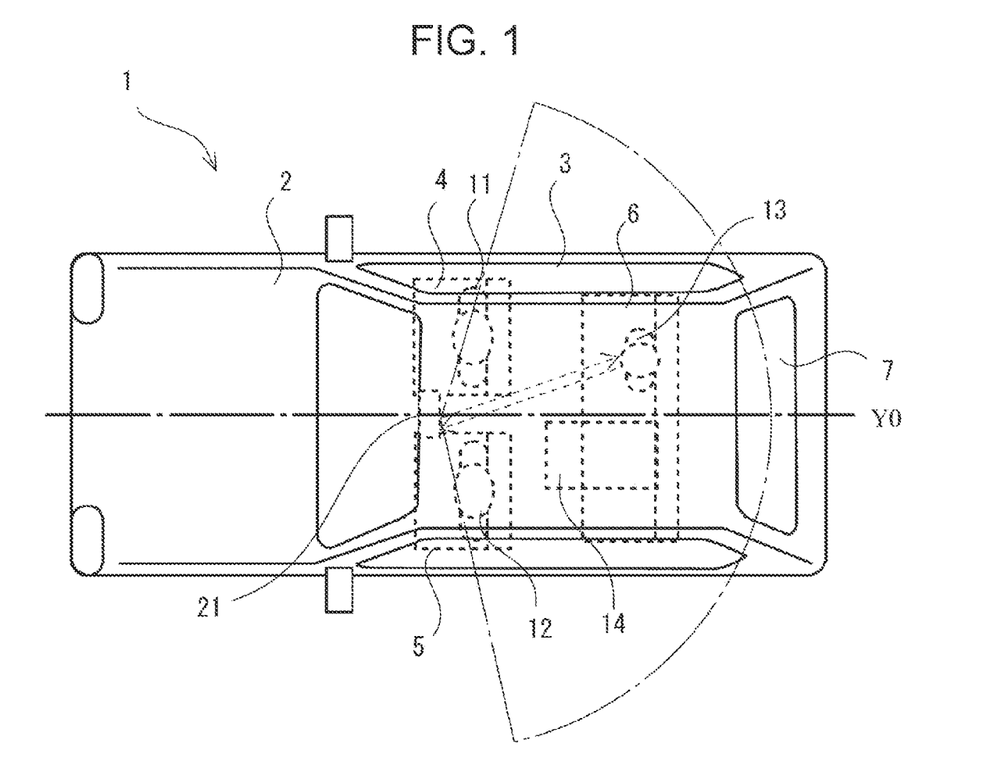
FIG. 1 is a schematic plan view of an automobile using an occupant detecting system according to an embodiment of the disclosure.

FIG. 1 is a schematic plan view of an automobile 1 using a system for detecting an occupant being left in the automobile 1 (hereinafter simply called the occupant detecting system) according to the embodiment.

Figure 2:
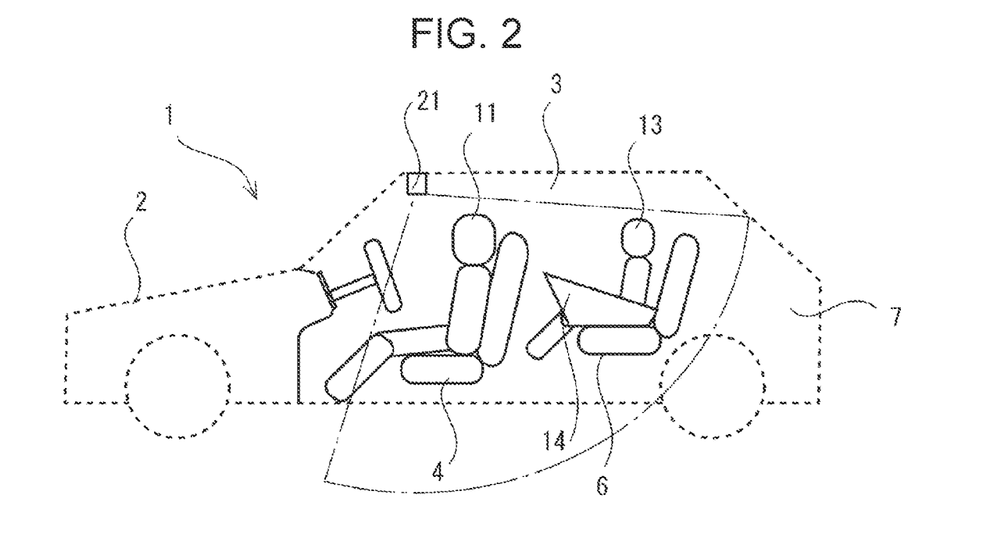
FIG. 2 is a schematic vertical sectional view of the automobile illustrated in FIG. 1.

FIG. 2 is a schematic vertical sectional view of the automobile 1 illustrated in FIG. 1 taken along line Y0, which indicates the center position in the widthwise direction of the automobile 1.

The automobile 1 is an example of a vehicle. Examples of a power source of the automobile 1 are an internal combustion engine that generates power by the combustion of a fuel such as gasoline or ethanol, an electric motor using stored electricity, a power source using hydrogen, and a combination of these power sources.

The automobile 1 illustrated in FIGS. 1 and 2 includes a body 2. The body 2 includes a vehicle compartment 3 (hereinafter simply called the compartment 3) which can accommodate plural occupants. Inside the compartment 3, plural seats 4 through 6 are disposed in the longitudinal (front-back) direction of the automobile 1. In one example, from the front side of the automobile 1, the seat 4 in the first row where a driver 11 can sit, the seat 5 in the first row where an occupant 12 can sit, and the seat 6 in the second row where plural occupants can sit side by side in the widthwise direction of the automobile 1 are disposed. In the automobile 1, the seats 4 and 5 in the first row are the frontmost seats, while the seat 6 in the second row is the backmost seat. Behind the seat 6, a luggage compartment 7 is disposed.

When the driver 11 gets in the automobile 1, he/she opens the front right door (not illustrated), enters the compartment 3, sits in the driver seat 4 in the first row, and then closes the door. When the driver 11 gets out of the automobile 1, he/she opens the front right door, leaves the compartment 3, and closes the door.

When the occupant 12 gets in the automobile 1, he/she opens the front left door (not illustrated), for example, enters the compartment 3, sits in the seat 5 in the first row, and then closes the door. When the occupant 12 gets out of the automobile 1, he/she opens the front left door, leaves the compartment 3, and closes the door.

When a child 13 gets in the automobile 1, he/she opens the rear right door or the rear left door (not illustrated), enters the compartment 3, sits in the seat 6 in the second row, and then closes the door. When the child 13 gets out of the automobile 1, he/she opens the rear right door or the rear left door, leaves the compartment 3, and closes the door. If the child 13 is an infant who needs help, an adult, such as the driver 11 or the occupant 12, opens the rear right door or the rear left door, fixes an infant car seat 14 on the back seat 6, and then places the infant on the infant car seat 14. The child 13 may sit in the seat 5 next to the driver seat 4, while the occupant 12 may sit in the seat 6.

Adults and the child 13 directly sitting in the seats 4 through 6 fasten seatbelts (not illustrated), so that they can sit by leaning their upper bodies against the backrests of the seats 4 through 6. Basically, the position of each of the occupants sitting in the seats 4 through 6 is included within a certain range.

While the occupants including the driver 11 and the occupant 12 sit in the seats 4 through 6 in the compartment 3, the automobile 1 starts to run by the driving operation of the driver 11, driving support, or autonomous driving.

In the above-described automobile 1, it may be possible to monitor the occupants in the compartment 3 during driving and to execute control processing for making an emergency call or bringing the automobile 1 to an emergency stop in case of an emergency.

It may also be possible to output an alert about the child 13 or an object being left in the compartment 3 after an adult, such as the driver 11, has left the automobile 1.

Figure 3:
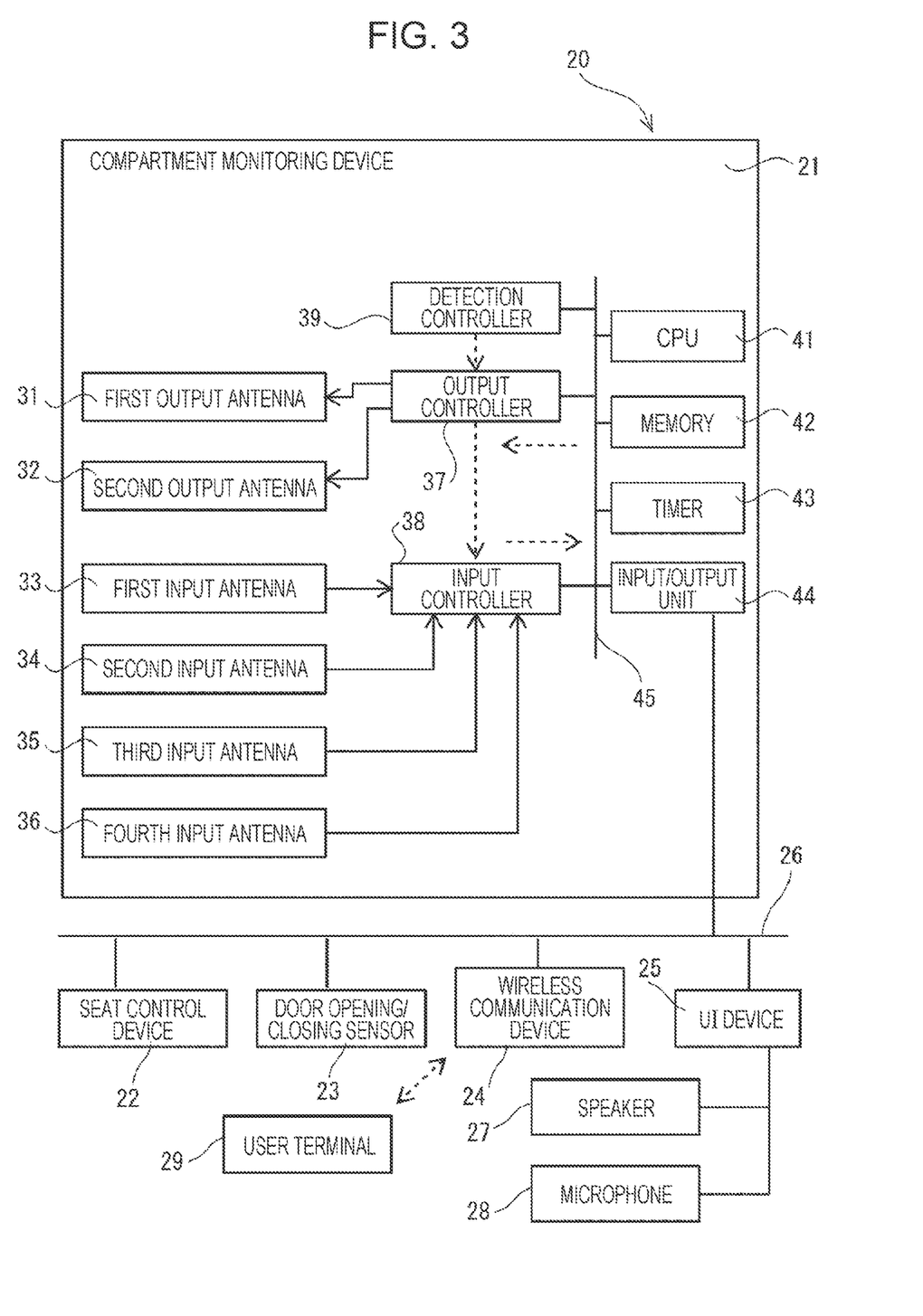
FIG. 3 is a block diagram of a control system of the automobile illustrated in FIG. 1.

FIG. 3 is a block diagram of a control system 20 of the automobile 1.

The control system 20 illustrated in FIG. 3 serves as the above-described occupant detecting system that is used for the automobile 1 to monitor occupants and objects in the compartment 3.

The control system 20 illustrated in FIG. 3 includes a compartment monitoring device 21, a seat control device 22, a door opening/closing sensor 23, a wireless communication device 24, a user interface (UI) device 25, and an in-vehicle network 26 to which these elements are coupled.

The in-vehicle network 26 may be a wired communication network for the automobile 1 such as the one based on a controller area network (CAN) or a local interconnect network (LIN). The in-vehicle network 26 may be a communication network such as a local area network (LAN), or a combination of the above-described types of communication networks. The in-vehicle network 26 may partially include a wireless communication network.

The seat control device 22 includes an actuator (not illustrated), for example, and controls the front-back positions, top-bottom positions, seatback angles of the plural seats 4 through 6 in the automobile 1. When occupants sitting in the seats 4 through 6 are identified, the seat control device 22 may perform control so that the front-back positions, top-bottom positions, seatback angles of the seats 4 through 6 become predetermined settings for the individual occupants. The seat control device 22 may also control the top-bottom position of the seatbelt retained in the body 2, based on the setting for each occupant. To perform control operations, the seat control device 22 may obtain setting data from the individual devices of the automobile 1 via the in-vehicle network 26.

The door opening/closing sensor 23 senses that the doors (not illustrated) of the automobile 1 are opened and closed. The door opening/closing sensor 23 may be provided for each of the doors, such as the above-described front right door, front left door, rear right door, and rear left door, and the hatchback door on the rear side of the body 2. When the door opening/closing sensor 23 has sensed that a door is opened and closed, it supplies detection data to the individual devices of the automobile 1 via the in-vehicle network 26.

The wireless communication device 24 establishes a wireless communication path with a wireless communication base station (not illustrated), which is disposed outside the automobile 1, and sends and receives data with the base station. Examples of the base station are a base station for commercial mobile communication and a base station for sending and receiving traffic information. The base station is coupled to a server device. The wireless communication device 24 may also send and receive data directly or via the base station with a user terminal 29 used by a user, such as an occupant of the automobile 1. The wireless communication device 24 may be a device supporting communication standards, such as IEEE802.11 and IEEE802.15, to directly send and receive data with the user terminal 29. The control system 20 of the automobile 1 may include plural wireless communication devices 24 for individual communication standards. Upon obtaining data from the individual devices of the automobile 1 via the in-vehicle network 26, the wireless communication device 24 sends the data to the base station and the user terminal 29. Upon receiving data from the base station and the user terminal 29, the wireless communication device 24 supplies the received data to the individual devices of the automobile 1 via the in-vehicle network 26.

The UI device 25 is coupled to a liquid crystal device, a touchscreen device, various switches, a speaker 27, and a microphone 28, for example, disposed in the compartment 3 of the automobile 1. Upon obtaining data from the individual devices of the automobile 1 via the in-vehicle network 26, the UI device 25 outputs the data via the liquid crystal device and/or the speaker 27. This enables an occupant in the automobile 1 to obtain information of the automobile 1 via the UI device 25. When an input operation is performed using the touchscreen device or a switch or when a predetermined voice is input into the microphone 28, the UI device 25 supplies data on the input operation or input voice to the individual devices of the automobile 1 via the in-vehicle network 26.

The compartment monitoring device 21 monitors occupants and objects in the compartment 3. The compartment monitoring device 21 includes a detection controller 39, an output controller 37, an input controller 38, an input/output unit 44, a timer 43, a memory 42, a central processing unit (CPU) 41, and an internal bus 45 to which these elements are coupled. The elements forming the compartment monitoring device 21 can input and output data via the internal bus 45.

A first output antenna 31 and a second output antenna 32 are coupled to the output controller 37. The output controller 37 individually controls outputting of a millimeter radio wave, which is used for detecting occupants and objects in the compartment 3, (hereinafter such a radio wave will simply be called a millimeter radio wave) from the first output antenna 31 and that from the second output antenna 32. In this manner, millimeter radio waves are output from two channels constituted by the first and second output antennas 31 and 32. A millimeter radio wave from the first output antenna 31 and that from the second output antenna 32 may be output simultaneously or at different timings. A millimeter radio wave may be temporally continuous or discrete. Coding data may be superimposed on millimeter radio waves output from the first and second output antennas 31 and 32. In this case, coding data used in the first output antenna 31 and that in the second output antenna 32 may be different from each other.

A first input antenna 33, a second input antenna 34, a third input antenna 35, and a fourth input antenna 36 are coupled to the input controller 38. Millimeter radio waves output from the first and second output antennas 31 and 32 are reflected by an occupant or an object in the compartment 3, and such reflected waves are input into the first through fourth input antennas 33 through 36. The input controller 38 monitors and controls inputting of a reflected wave into each of the first through fourth input antennas 33 through 36. Millimeter radio waves output from the two channels constituted by the output antennas 31 and 32 may be input into the four channels constituted by the four input antennas 33 through 36. The input timing of a reflected wave into each of the four input antennas 33 through 36 is determined by the distance from the output antenna having output a millimeter radio wave to an occupant or an object having reflected the millimeter radio wave and the distance from the occupant or the object to the corresponding input antenna. Basically, the radio wave reflected by the same occupant or object is input into at least three input antennas, so that the distance to and the direction of the occupant or the object based on the input and output antennas can be uniquely determined three-dimensionally. It is also possible that multiple radio waves reflected by different occupants or objects located in multiple directions be input into the same input antenna simultaneously. By combining outputs from the two channels and inputs into the four channels, a reflected wave component of an occupant or an object in each direction can be separated from the combined waves constituted by multiple reflected waves and the distance to this occupant or object can be calculated for each direction. The spatial resolution high enough to detect plural occupants in the compartment 3 can be obtained by using coding data superimposed on a millimeter radio wave output from an output antenna or by performing timing control for outputting millimeter radio waves and inputting reflected waves.

The detection controller 39 performs timing control of the output controller 37 and the input controller 38. For example, the detection controller 39 controls the timings at which millimeter radio waves are output from the two channels and the timings at which reflected waves are input into the four channels. The detection controller 39 may also set the frequency of millimeter radio waves which are output from the first and second output antennas 31 and 32 under the control of the output controller 37. Millimeter radio waves at a low frequency of about 24 GHz can be used. Additionally, millimeter radio waves at a high frequency of about 60 to 78 GHz are also being put to practical use. The detection controller 39 may select one of multiple frequencies, such as 24 GHz, 60 GHz, and 72 GHz, and set the selected frequency in the output controller 37. When the frequency is set, the output controller 37 performs control to output millimeter radio waves of the selected frequency from the first and second output antennas 31 and 32.

As described above, the output controller 37, the first and second output antennas 31 and 32, the input controller 38, the first through fourth input antennas 33 through 36, and the detection controller 39 output millimeter radio waves to the compartment 3 of the automobile 1 and detect waves reflected by occupants and objects in the compartment 3 of the automobile 1. In one embodiment, the output controller 37, the first and second output antennas 31 and 32, the input controller 38, the first through fourth input antennas 33 through 36, and the detection controller 39 may each serve a "sensor". Hereinafter, the output controller 37, the first and second output antennas 31 and 32, the input controller 38, the first through fourth input antennas 33 through 36, and the detection controller 39 may also be called the sensors 31 through 39.

The input/output unit 44 is coupled to the in-vehicle network 26. The input/output unit 44 sends and receives data with the individual devices of the automobile 1 via the in-vehicle network 26.

The timer 43 measures various times including the clock time. The timer 43 may measure the periodic timings of outputting radio waves and the time elapsed from each output timing of radio waves, for example.

The memory 42 stores a program to be executed by the CPU 41, data used for the execution of the program, and data generated by the execution of the program. The memory 42 may be constituted by a volatile memory, such as a random access memory (RAM), and a non-volatile memory, such as a solid state drive (SSD) or a hard disk drive (HDD).

As a result of the CPU 41 reading and executing the program stored in the memory 42, a controller is implemented in the compartment monitoring device 21 so as to centrally control the operation of the compartment monitoring device 21.

The CPU 41 may detect and monitor an in-vehicle object, such as an occupant or an object, in the compartment 3 based on a reflected wave, that is, a millimeter radio wave reflected by an in-vehicle object, for example. In one example, the CPU 41 may serve as a "controller".

The CPU 41 may select the frequency of millimeter radio waves from among preset frequencies and instruct the detection controller 39 to set the selected frequency. The frequencies of radio waves that may be selected by the CPU 41 are multiple frequencies including a first radio wave of 60 GHz and a second radio wave of 24 GHz, which is lower than the first radio wave. In this case, the detection controller 39 sets the frequency selected by the CPU 41 so as to switch the frequency of millimeter radio waves.

The CPU 41 may also monitor an occupant getting in the automobile 1, sitting in a seat, and getting out of the automobile 1 and an object being brought in and taken out of the automobile 1.

The CPU 41 may also determine the presence or the absence of an in-vehicle object being left in the compartment 3 of the automobile 1 and also the type of in-vehicle object, at least based on the detection results obtained from reflected waves detected by the sensors 31 through 39.

As illustrated in FIG. 1, the compartment monitoring device 21 including the sensors 31 through 39 is disposed at the front edge of the roof of the compartment 3 and at the center position in the widthwise direction of the automobile 1 indicated by the line Y0. For example, the compartment monitoring device 21 is installed on an overhead console. The compartment monitoring device 21 outputs millimeter radio waves toward the entirety of the compartment 3 mainly from the installation position of the compartment monitoring device 21 to the rear bottom of the compartment 3. In this manner, the compartment monitoring device 21 is located at the top front position of the compartment 3, which is forward of the seatbacks of all the seats 4 through 6 in the compartment 3, while facing the rear bottom of the compartment 3. That is, the compartment monitoring device 21 can output millimeter radio waves toward the front sides of the chests of occupants sitting in the seats 4 through 6. The focused area of radio waves output from the compartment monitoring device 21 is not limited to a particular direction if it is backward in the compartment 3.

In the compartment monitoring device 21 installed on the overhead console, the first output antenna 31 and the second output antenna 32 may be disposed in the widthwise direction or the longitudinal direction of the automobile 1, for example, with a certain space therebetween.

The first through fourth input antennas 33 through 36 may be disposed in a region having a shape of a quadrilateral defined by a pair of line segments along the widthwise direction of the automobile 1 and a pair of line segments along the longitudinal direction of the automobile 1.

Figure 4:
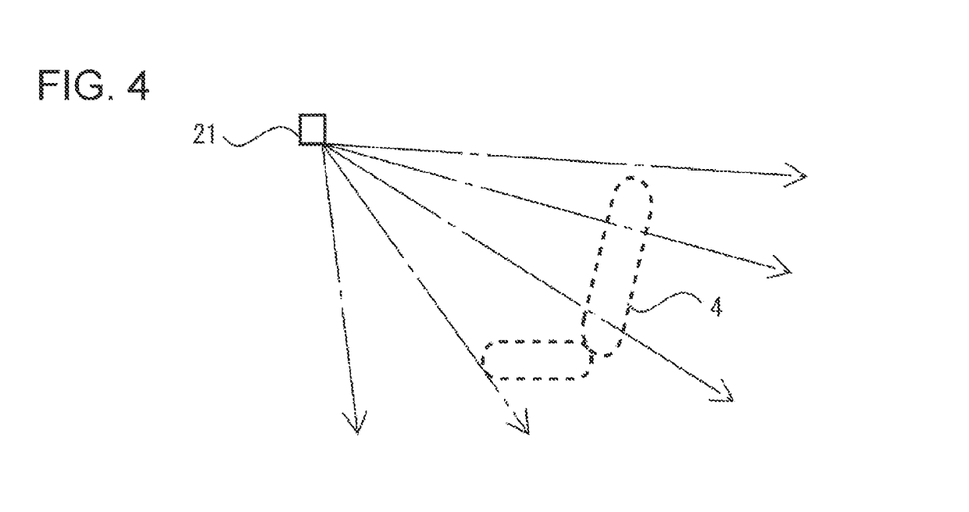
FIG. 4 illustrates a first detection state for explaining a theory about occupant detection performed by sensors used in a compartment monitoring device illustrated in FIG. 3.

FIG. 4 illustrates a first detection state for explaining a theory about occupant detection using the sensors 31 through 39 of the compartment monitoring device 21 illustrated in FIG. 3.

In FIG. 4, the seat 4 and the compartment monitoring device 21 installed at the top front position as viewed from the seat 4 are illustrated. The compartment monitoring device 21 outputs a millimeter radio wave of a set frequency from an output antenna, such as the first output antenna 31 or the second output antenna 32.

In FIG. 4, no in-vehicle object, such as an occupant or an object, is placed on the seat 4. The millimeter radio wave output from the compartment monitoring device 21 toward the seat 4 in the rear bottom direction of the compartment 3 passes through the seat 4. Basically, the seat 4 is made of a seat frame having springs placed thereover and entirely covered with urethane or cloth. The seat 4 having this structure and made of such a material hardly reflects millimeter radio waves. As a result, no reflected wave from the seat 4 is input into the compartment monitoring device 21.

Figure 5:
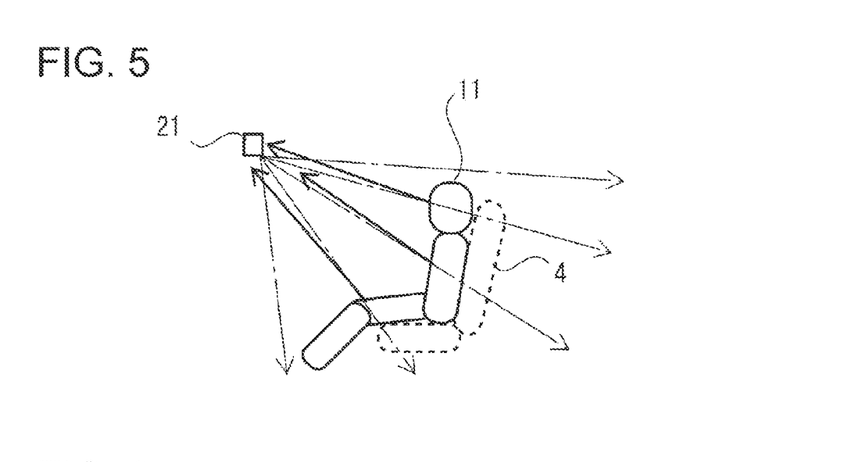
FIG. 5 illustrates a second detection state in which an occupant is sitting in the seat illustrated in FIG. 4.

FIG. 5 illustrates a second detection state in which an occupant is sitting in the seat 4 illustrated in FIG. 4. In FIG. 5, the occupant sitting in the seat 4 is illustrated together with the seat 4 and the compartment monitoring device 21 installed at the top front position as viewed from the seat 4.

With the occupant in the seat 4, a millimeter radio wave output from an output antenna, such as the first output antenna 31 or the second output antenna 32, can be reflected by the surface of the occupant and be returned toward the compartment monitoring device 21. The reflected waves are thus input into the multiple input antennas 33 through 36 of the compartment monitoring device 21. As a result, the compartment monitoring device 21 can detect strong reflected waves, unlike in the first detection state illustrated in FIG. 4.

Figure 6:
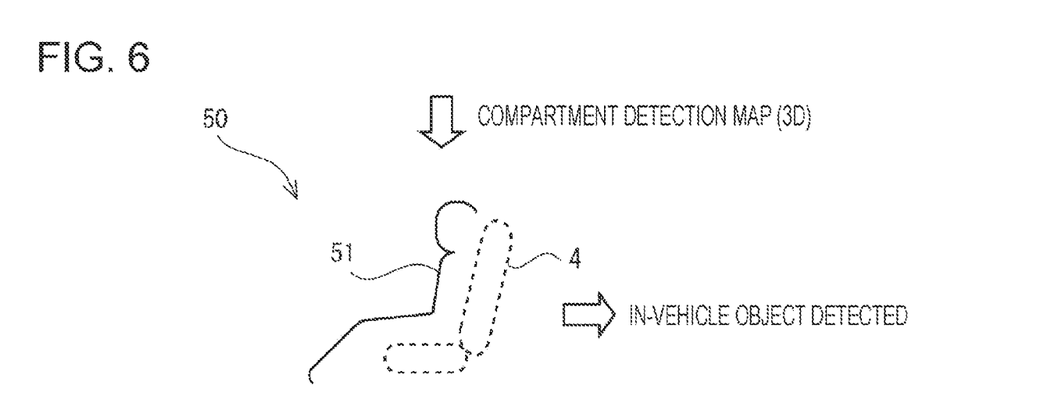
FIG. 6 illustrates a three-dimensional compartment detection map that can be created based on the detection of the sensors in the second detection state in FIG. 5.

FIG. 6 illustrates a three-dimensional compartment detection map 50 that can be created based on the detection of the sensors 31 through 39 in the second detection state in FIG. 5.

In FIG. 6, a reflection surface 51 detected from the occupant sitting in the seat 4 is illustrated together with the seat 4. The CPU 41 of the compartment monitoring device 21 combines and uses outputs from the two channels and inputs into the four channels so as to separate a reflected wave component of an occupant or an object in each direction from the combined input waves constituted by multiple reflected waves and to calculate the distance to the occupant or the object for each direction. The CPU 41 may change the output timings of millimeter radio waves from the plural output antennas 31 and 32 and also change the detection period and timing of millimeter radio waves input into the plural input antennas 33 through 36. In this manner, the CPU 41 can determine the distance to an occupant or an object for each incident direction of a reflected wave, which is based on the installation position of the compartment monitoring device 21. This enables the CPU 41 to generate the compartment detection map 50 including the three-dimensional reflection surface 51, which is along the surface of the occupant as indicated by the solid line in FIG. 6.

If it is desirable to detect the breathing motion on the surface of the chest of the occupant quietly sitting in the seat 4 from millimeter reflected waves, motion components which change over time are to be included on the reflection surface 51 of the compartment detection map 50. In this case, instead of using millimeter radio waves at a low frequency of about 24 GHz, those at a high frequency of at least 50 MHz or higher, and more preferably, 60 to 78 GHz, are used. By the use of millimeter radio waves of a high frequency, breathing motion components which change over time on the surface of the chest of the occupant can be observed in the compartment detection map 50. Using millimeter radio waves of a high frequency can also obtain spatial resolution in the compartment detection map 50 high enough to detect the breathing motion on the surface of the chest of each occupant in the compartment 3.

Conversely, if it is desirable to obtain the compartment detection map 50 which covers the entirety of the compartment 3 in a wide range including every corner, millimeter radio waves of a low frequency at about 24 GHz or lower is used. Although, unlike millimeter radio waves of a high frequency, radio waves of a low frequency are unable to detect the motion on the surface of the chest of an occupant and the size and the shape of an in-vehicle object with high precision, they are resistant to obstacles by easily curving and entering the back side of an object. Millimeter radio waves of a high frequency at about 60 GHz or higher are not able to effectively reach the area behind a seatback with an iron plate and the edges of the compartment 3 in the widthwise direction of the automobile 1, for example. Even if an occupant or an object is located in the area of the compartment 3 where such high-frequency radio waves are unable to reach, waves reflected by the occupant or the object are not likely to be obtained. The seatback of the backmost seat located forward of the luggage compartment 7, such as the seat 6 in the second row illustrated in FIG. 1, may have an iron plate entirely in the widthwise direction of the automobile 1.

To address the above-described issue, in the embodiment, the frequency of millimeter radio waves for detecting an in-vehicle object is switched between at least two frequencies, that is, a higher frequency and a lower frequency. In the embodiment, 60 GHz and 24 GHz are used as one example.

In the embodiment, since the frequency of millimeter radio waves is switched, the mere provision of the single compartment monitoring device 21 can detect the entire compartment 3 in a wide range including every corner with a high spatial resolution. This can eliminate the provision of plural compartment monitoring devices 21 for the individual seats 4 through 6 in the compartment 3. The single compartment monitoring device 21 does not significantly increase the cost, which may be incurred by using millimeter radio waves for monitoring occupants and objects in the compartment 3. Additionally, the provision of the single compartment monitoring device 21 does not excessively limit the arrangement of various devices including the compartment monitoring device 21 in the compartment 3.

Figure 7:
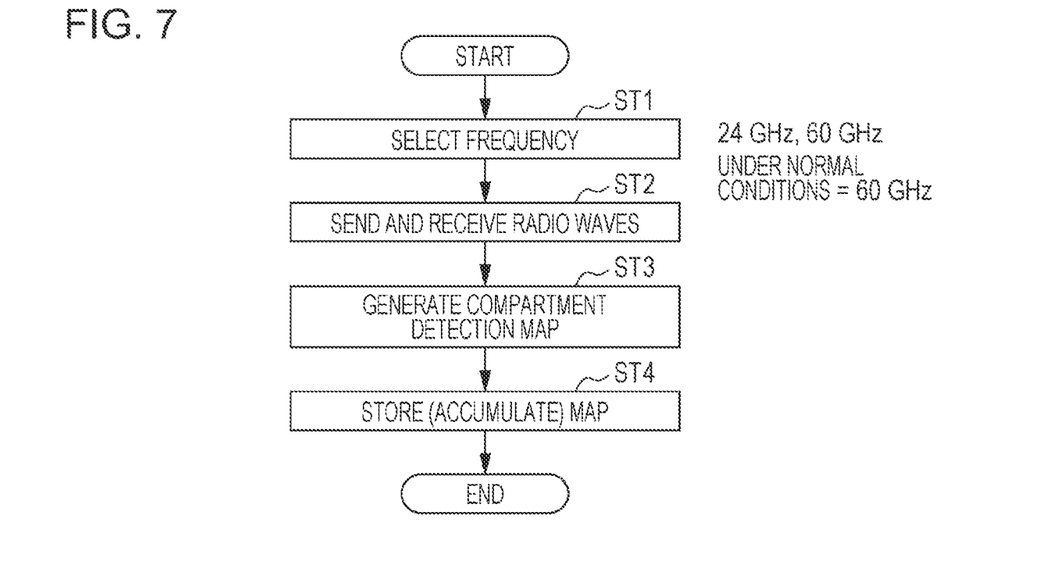
FIG. 7 is a flowchart illustrating millimeter-radio-wave detection control processing executed by a central processing unit (CPU) of the compartment monitoring device illustrated in FIG. 3.

FIG. 7 is a flowchart illustrating millimeter-radio-wave detection control processing executed by the CPU 41 of the compartment monitoring device 21 illustrated in FIG. 3.

The CPU 41 repeatedly executes the processing in FIG. 7. The CPU 41 may repeatedly execute the processing in FIG. 7 in every detection period measured by the timer 43.

In step ST1, from multiple frequencies, such as 60 GHz and 24 GHz, the CPU 41 selects the frequency of millimeter radio waves for detecting in-vehicle objects including occupants in the compartment 3.

For example, under the normal conditions, such as during the driving of the automobile 1, the CPU 41 may select 60 GHz, which is a higher frequency, to detect the breathing motion on the surface of the chest of an occupant in the compartment 3.

When detecting the child 13 or an object being left in the compartment 3, the CPU 41 may select 24 GHz, which is a lower frequency, to detect the entire compartment 3 including every corner.

In step ST2, the CPU 41 causes the first output antenna 31 and the second output antenna 32 to output millimeter radio waves of the selected frequency and detects the input of reflected waves. In response to an instruction to output millimeter radio waves from the CPU 41, the output controller 37 performs control so that the first and second output antennas 31 and 32 output millimeter radio waves of the selected frequency. The output controller 37 may adjust the interval between the output timing of the first output antenna 31 and that of the second output antenna 32 to scan the compartment 3.

If occupants are sitting in the seats 4 through 6 and/or if objects are placed on the seats 4 through 6 or in the luggage compartment 3, the output millimeter radio waves are reflected by the occupants and/or the objects and are input into the first through fourth input antennas 33 through 36 of the compartment monitoring device 21. The input controller 38 generates information on the reflected waves input into each of the first through fourth input antennas 33 through 36 and outputs the generated information to the CPU 41.

In step ST3, the CPU 41 generates a compartment detection map 50 indicating the positions and the ranges of the reflection surfaces of occupants and/or objects in the compartment 3, based on the detection information on the reflected waves output from the input controller 38. Basically, a compartment detection map 50 is created for the range where millimeter radio waves have scanned the compartment 3 indicated by the long dashed dotted lines in FIG. 1.

The CPU 41 generates a compartment detection map 50 indicating the scanned compartment 3, based on the waves reflected by various portions of the compartment 3 and detected by the sensors 31 through 39.

In step ST4, the CPU 41 records the generated compartment detection map 50 in the memory 42, together with information on the detection time measured by the timer 43. In this manner, plural compartment detection maps 50 generated at different timings are recorded in the memory 42 in association with information on the individual detection times. The plural compartment detection maps 50 include information on the motions of the occupants and objects in the compartment 3.

Figure 8:
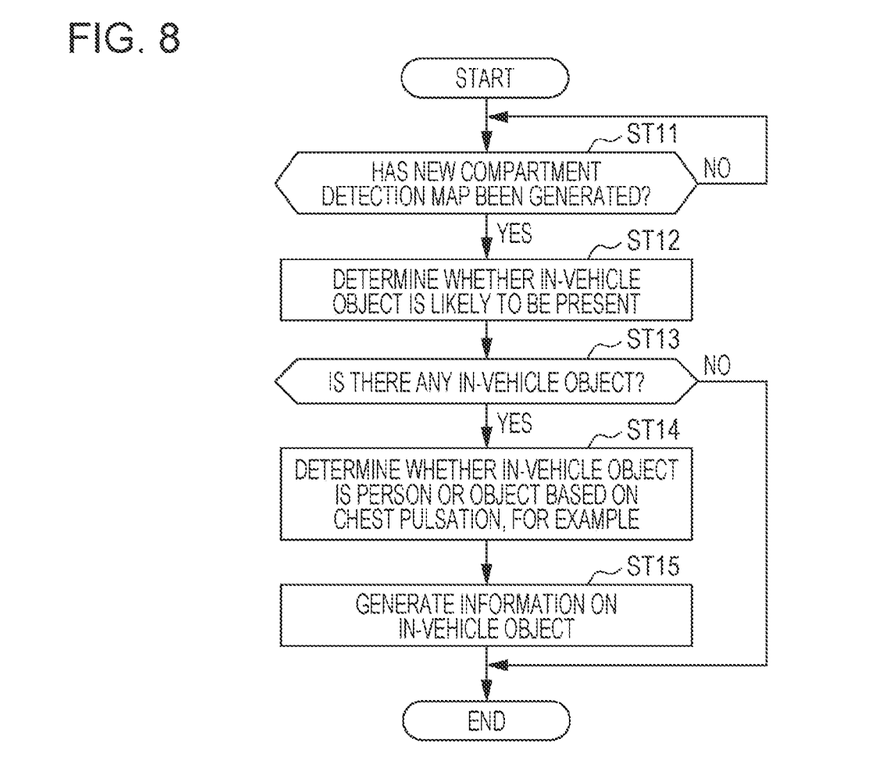
FIG. 8 is a flowchart illustrating in-vehicle object detecting and determining control processing executed by the CPU of the compartment monitoring device illustrated in FIG. 3.

FIG. 8 is a flowchart illustrating in-vehicle object detecting and determining control processing executed by the CPU 41 of the compartment monitoring device 21 illustrated in FIG. 3.

The CPU 41 repeatedly executes the processing in FIG. 8 every time it executes the detection control processing in FIG. 7. The CPU 41 may repeatedly execute the processing in FIG. 8 in every detection period measured by the timer 43.

In step ST11, the CPU 41 determines whether a new compartment detection map 50 has been generated. The CPU 41 may make this determination according to whether a newly generated compartment detection map 50 is recorded in the memory 42, for example. If a new compartment detection map 50 has not been generated, the CPU 41 repeats step ST11. If a new compartment detection map 50 has been generated, the CPU 41 proceeds to step ST12.

In step ST12, the CPU 41 determines whether an in-vehicle object is likely to be present in the compartment 3, based on the new compartment detection map 50. A compartment detection map 50 includes components of an occupant or an object which has reflected millimeter radio waves on its reflection surface. The CPU 41 may make this determination by comparing components in the new compartment detection map 50 with those in a compartment detection map 50 without any occupant or any object and by detecting components different between the two compartment detection maps 50 (hereinafter such components will be called the difference components), for example. The CPU 41 may estimate the size of an in-vehicle object from the range where the difference components are included in the new compartment detection map 50. The CPU 41 may also estimate the position of the seat on which the in-vehicle object, which represents the difference components, is placed, based on the position of the range where the difference components are included in the compartment detection map 50. In this case, the position of the seat is estimated based on the position of the compartment monitoring device 21. If the CPU 41 has determined that multiple in-vehicle objects are likely to be present in the compartment 3, the CPU 41 may estimate the size and the position of each of the in-vehicle objects.

In step ST13, the CPU 41 determines the presence or the absence of an in-vehicle object. If it is found in step ST12 that even one in-vehicle object is likely to be present, the CPU 41 determines that an in-vehicle object is present in the compartment 3 and proceeds to step ST14. If it is found in step ST12 that not even one in-vehicle object is likely to be present, the CPU 41 determines that no in-vehicle object is in the compartment 3 and terminates this processing.

The CPU 41 is able to determine the presence or the absence of an in-vehicle object in the compartment 3 of the automobile 1 and the type of the in-vehicle object, based on the compartment detection map 50. This determination using the compartment detection map 50 is an example of a determination about the presence or the absence of an in-vehicle object based on a detection result obtained from the reflected waves detected by the sensors 31 through 39.

In step ST14, the CPU 41 determines whether the detected in-vehicle object is a person (occupant) or an object.

To make this determination, for example, the CPU 41 uses plural compartment detection maps 50 from past compartment detection maps 50 to the latest compartment detection map 50 and generates a path of the positions of the in-vehicle object in a predetermined direction, which are estimated as the range of the in-vehicle object. For example, the CPU 41 uses a diagram having the time on the horizontal axis and the relative position on the vertical axis and plots the positions of the in-vehicle object in the predetermined direction at individual time points. If the positions of the in-vehicle object in the predetermined direction are the surface of the chest of an occupant in the compartment 3, the waveform as the path of the plotted positions indicates the motion on the surface of the chest which changes as the occupant breathes.

An adult breathes about 10 to 15 times per minute under the normal conditions, such as when he/she is sitting in one of the seats 4 through 6. A child 13 usually breathes about 20 times or greater per minute under the normal conditions.

If the waveform as the path of the plotted positions for 10 seconds or longer does not contain several to several dozens of motion components per minute, the CPU 41 determines that the estimated in-vehicle object is not a person but an object.

If the waveform as the path of the plotted positions contains several to several dozens of motion components per minute, the CPU 41 assumes that these components represent the pulsation on the chest and determines that the estimated in-vehicle object is a person as an occupant in the compartment 3.

If the motion components contained in the waveform are 18 per minute, which may be set as a threshold, or smaller, the CPU 41 may determine that the occupant is an adult.

If the motion components contained in the waveform are greater than 18 per minute, which is an example of the threshold, the CPU 41 may determine that the occupant is a child 13.

As a result, the CPU 41 is able to determine whether an adult is present as an occupant in the compartment 3.

In step ST15, the CPU 41 generates information on the determined in-vehicle object and records the generated information in the memory 42. As a result, information on an in-vehicle object, such as an occupant or an object, present in the compartment 3 of the automobile 1, which is determined based on at least the most recently generated compartment detection map 50, is recorded in the memory 42 in association with the in-vehicle object.

Figure 9:
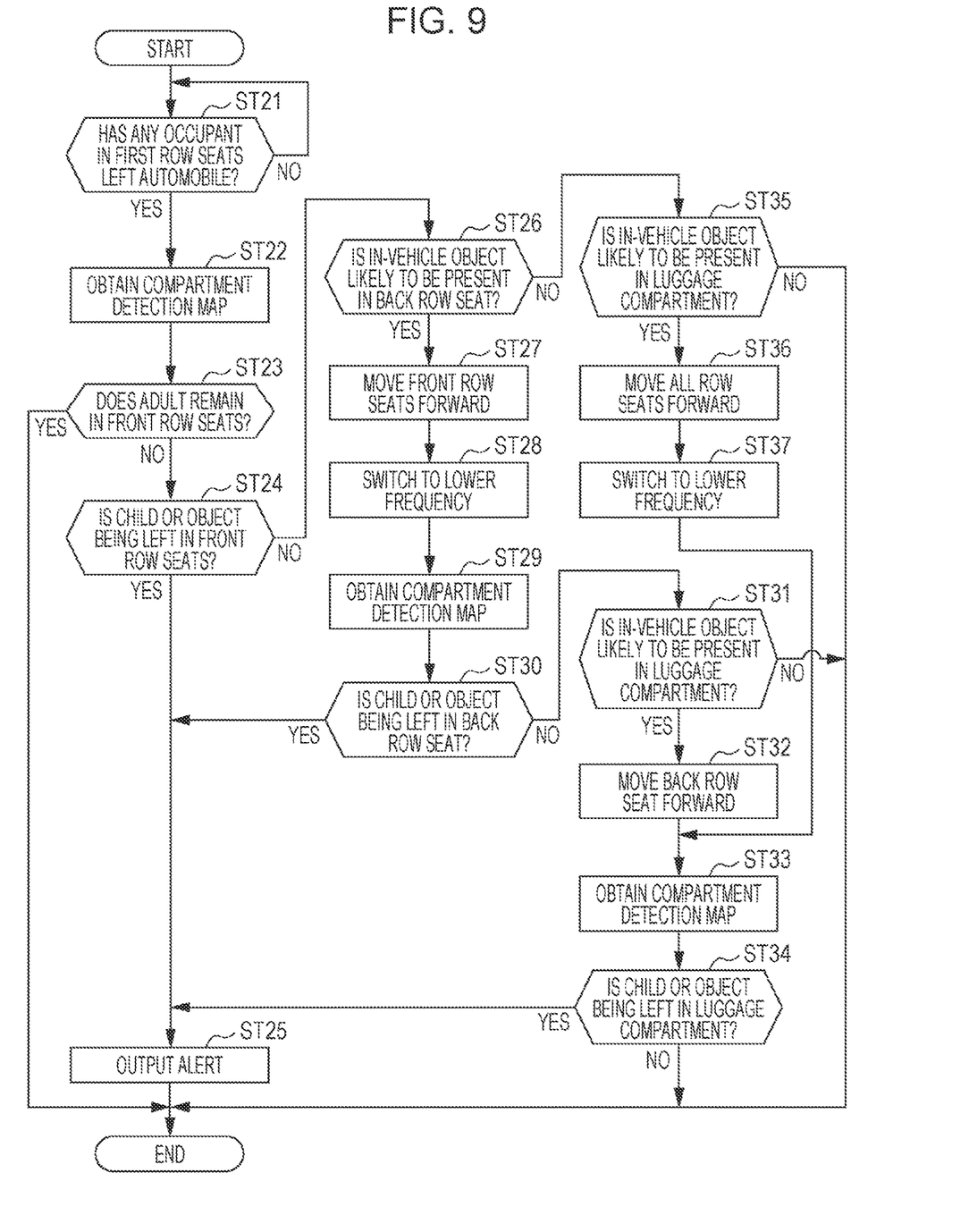
FIG. 9 is a flowchart illustrating control processing executed by the CPU of the compartment monitoring device to detect and determine an in-vehicle object being left in the automobile.

FIG. 9 is a flowchart illustrating control processing executed by the CPU 41 to detect an occupant or an object being left in the compartment 3.

The CPU 41 of the compartment monitoring device 21 repeatedly executes the processing in FIG. 9. The CPU 41 may repeatedly execute the processing in FIG. 9 in every detection period measured by the timer 43.

In step ST21, the CPU 41 determines whether any occupant in the front seats 4 and 5 of the first row has left the automobile 1. In one example, the CPU 41 may determine whether an adult occupant has left the automobile 1.

Basically, at least one adult, such as the driver 11 driving the automobile 1, sits in the seats 4 and 5 of the first row.

For example, the CPU 41 determines whether an adult occupant remains in the compartment 3, based on a change in the state of the automobile 1 which is generated when an adult occupant is leaving the automobile 1. When an adult is leaving the automobile 1, the detection state of a pressure sensor provided in each of the front seats 4 and 5 is changed from a sensing state to a non-sensing state, and the front right door or the front left door, which is used by the occupant to sit in the seat 4 or 5, is opened and closed. For example, the CPU 41 may determine whether an adult has left the seat 4 or 5 by obtaining information indicating whether the front right door or the front left door has opened and closed sensed by the door opening/closing sensor 23. Alternatively, the CPU 41 may determine whether an occupant has left the driver seat 4 by obtaining information indicating whether the front right door has opened and closed sensed by the door opening/closing sensor 23.

If it is found that no occupant has left the front seat 4 or 5, the CPU 41 repeats step S21. When an occupant has left the front seat 4 or 5, the CPU 41 proceeds to step ST22.

In step ST22, the CPU 41 obtains a compartment detection map 50, which is the latest compartment detection map 50 after an occupant is found to have left the seat 4 or 5.

In step ST23, the CPU 41 determines whether an adult still remains in one of the front seats 4 and 5, based on the compartment detection map 50 obtained in step ST22. Determining of the type of in-vehicle object based on the compartment detection map 50 may be made in a manner similar to step ST14 in FIG. 8.

In this manner, the CPU 41 determines whether an adult occupant remains in any of the front seats 4 and 5 by making multiple determinations including a determination based on the detection results obtained from the reflected waves detected by the sensors 31 through 39.

If it is found that no adult occupant remains in any of the front seats 4 and 5, the CPU 41 proceeds to step ST24. If an adult occupant is found to remain in one of the seats 4 and 5, the CPU 41 terminates the processing. In step ST23, the CPU 41 may determine whether an adult remains, not only in the front seats 4 and 5, but also in the back seat 6. In this case, the CPU 41 determines whether an adult remains in the whole compartment 3 of the automobile 1.

In step ST24, the CPU 41 determines whether in-vehicle object other than adults, that is, the child 13 or an object, is being left in the front seats 4 and 5 of the first row, based on the compartment detection map 50 obtained in step ST22. Determining of the type of in-vehicle object based on the compartment detection map 50 may be made in a manner similar to step ST14 in FIG. 8.

If the child 13 or an object is left in the front seats 4 and 5, the CPU 41 determines that an occupant is being left in the compartment 3 and proceeds to step ST25.

If no child 13 or no object is left in the front seats 4 and 5, the CPU 41 proceeds to step ST26.

In step ST25, the CPU 41 outputs an alert to inform that the child 13 or an object is being left in the compartment 3. The CPU 41 outputs an alert via the input/output unit 44 and the in-vehicle network 26. The wireless communication device 24 sends alert information to the user terminal 29 of the adult occupant having left the automobile 1 or to a server device. The UI device 25 outputs an alert sound from the speaker 27 coupled to the UI device 25.

In step ST26, the CPU 41 determines whether an in-vehicle object is being left in the back seat 6 of the second row, based on an in-vehicle object estimation history.

In the memory 42, information on an in-vehicle object determined as a person or an object based on a past compartment detection map 50 is recorded. The CPU 41 may determine the presence or the absence of an in-vehicle object in the back seat 6, based on this information as the in-vehicle object estimation history, for example.

When the child 13 is leaving the automobile 1, the detection state of a pressure sensor provided in the seat 6 is changed from a sensing state to a non-sensing state, and the rear right door or the rear left door, which is used by the occupant to sit in the back seat 6, is opened and closed. The CPU 41 may also obtain a detection history of the pressure sensor and use it for determining the presence or the absence of an in-vehicle object in the back seat 6.

If it is likely that an in-vehicle object is present in the back seat 6 from the in-vehicle object estimation history, the CPU 41 executes processing for confirming the presence of an in-vehicle object in the back seat 6. The CPU 41 proceeds to step ST27.

If it is found from the in-vehicle object estimation history that no in-vehicle object is likely to be present in the back seat 6, the CPU 41 determines that no in-vehicle object is being left in the back seat 6 and proceeds to step ST35.

In step ST27, the CPU 41 performs control to move forward the front seats 4 and 5, which are positioned in front of the back seat 6. The CPU 41 instructs the seat control device 22 to move the front seats 4 and 5 forward. In response to this instruction, the seat control device 22 moves the front seats 4 and 5 until the front edge. The seat control device 22 may also fold the seatbacks of the front seats 4 and 5 to the frontmost positions. This enables the compartment monitoring device 21 installed on the overhead console to directly monitor the floor beneath the back seat 6 as well as the back seat 6. Even if the child 13 enters underneath the back seat 6, it can be expected that the compartment monitoring device 22 directly outputs millimeter radio waves to the child 13.

In step ST28, the CPU 41 selects 24 GHz, which is the lowest frequency among the selectable frequencies of millimeter radio waves, so as to switch the frequency of millimeter radio waves to be output. For example, the CPU 41 switches the frequency of millimeter radio waves from a higher frequency of 60 GHz, which is used under the normal conditions, to a lower frequency of 24 GHz. The CPU 41 instructs the output controller 37 to set the selected frequency. Compared with millimeter radio waves at a higher frequency of 60 GHz, millimeter radio waves at a lower frequency of 24 GHz have a low spatial resolution but are resistant to obstacles. Even if the child 13 is hidden behind the front seats 4 and 5, it can be expected that the compartment monitoring device 21 outputs radio waves to the child 13.

The CPU 41 selects the switched lower frequency and executes the detection control processing in FIG. 7.

The output controller 37 performs control to output radio waves at a lower frequency of 24 GHz from the first and second output antennas 31 and 32.

Waves reflected by an occupant and/or an object which is left in the compartment 3 are input into the first through fourth input antennas 33 through 36. The input controller 38 outputs information on the reflected waves input into the first through fourth input antennas 33 through 36 to the CPU 41.

In step ST3 in FIG. 7, the CPU 41 generates a compartment detection map 50 based on the millimeter radio waves at a lower frequency of 24 GHz. In step ST4, the CPU 41 stores the generated compartment detection map 50 in the memory 42.

In step ST29, the CPU 41 obtains the compartment detection map 50 generated based on the millimeter radio waves at a lower frequency, which are output to the compartment 3 in the state in which the front seats 4 and 5 are moved forward.

With the compartment detection map 50 based on the millimeter radio waves of a lower frequency, the influence of obstacles can be reduced and the range where in-vehicle objects can be detected is increased, compared with a compartment detection map 50 based on the millimeter radio waves of a higher frequency. The entirety of the luggage compartment 7 is also expected to be detected.

In step ST30, the CPU 41 analyzes the compartment detection map 50 and determines whether the child 13 or an object is being left in the back seat 6.

As in the control processing in FIG. 8, the CPU 41 may determine whether the components in the direction of the back seat 6 included in the compartment detection map 50, which reflects the state in which the front seats 4 and 5 are moved forward, are those of the child 13 or an object.

In this manner, when an occupant is leaving the automobile 1, the CPU 41 switches radio waves to be output from the sensors 31 through 39 from a first radio wave of a high frequency to a second radio wave of a frequency lower than the first radio wave. This enables the CPU 41 to determine the presence or the absence and the type of an in-vehicle object which is left backward of the seats 4 and 5 in the first row in the compartment 3, based on the detection results obtained from the reflected waves detected by the sensors 31 through 39 having output the second radio wave.

If a history of a change in the state of the automobile 1 which is generated when an occupant sits in or accesses the back seat 6, which may correspond to the second or subsequent row in the compartment 3, is recorded, the CPU 41 performs control to move the front seats 4 and 5 forward, which are located forward of the back seat 6, and then to output millimeter radio waves of a lower frequency from the sensors 31 through 39. Then, the CPU 41 can determine the presence or the absence and the type of an occupant being left in the back seat 6 of the second row in the compartment 3 of the automobile 1, based on the detection results obtained from the reflected waves detected by the sensors 31 through 39.

If an in-vehicle object other than adults, such as the child 13 or an object, is left in the back seat 6, the CPU 41 determines that an in-vehicle object is being left in the compartment 3 and proceeds to step ST25. The CPU 41 outputs an alert in step ST25.

If no child 13 or no object is left in the back seat 6, the CPU 41 proceeds to step ST31.

In step ST31, the CPU 41 analyzes the in-vehicle object estimation history about the luggage compartment 7 behind the back seat 6.

As discussed above, the door opening/closing sensor 23 senses that the hatchback door on the rear side of the body 2 is opened and closed. In the memory 42, a history about opening and closing of the doors detected by the door opening/closing sensor 23 may be recorded. The CPU 41 may determine whether an in-vehicle object is present in the luggage compartment 7, based on the history about opening and closing of the doors recorded in the memory 42, for example.

If an in-vehicle object is likely to be present in the luggage compartment 7, the CPU 41 executes processing for confirming the presence of an in-vehicle object in the luggage compartment 7. The CPU 41 proceeds to step ST32.

If it is found that no in-vehicle object is left in the luggage compartment 7, the CPU 41 determines that no in-vehicle object is being left in the luggage compartment 7 and terminates the processing.

In step ST32, the CPU 41 performs control to move forward all the seats 4 through 6, which are positioned forward of the luggage compartment 7. If the front seats 4 and 5 of the first row are already moved forward in step ST27, the CPU 41 performs control to move the back seat 6 of the second row forward.

The CPU 41 instructs the seat control device 22 to move the back seat 6 forward. In response to this instruction, the seat control device 22 moves the back seat 6 until the front edge. The seat control device 22 may also perform control to fold the seatback of the back seat 6 to the frontmost position. This may enable the compartment monitoring device 21 installed on the overhead console to output millimeter radio waves toward the substantially entirety of the luggage compartment 7.

In step ST33, the CPU 41 obtains the compartment detection map 50 generated based on the millimeter radio waves at a lower frequency, which are output to the compartment 3 in the state in which the back seat 6 is moved forward.

In step ST28, the CPU 41 has already switched the frequency of millimeter radio waves to the lowest frequency, that is, 24 GHz, and has set the selected frequency. It can be expected that millimeter radio waves at 24 GHz are output to and reach even small objects behind the back seat 6.

The CPU 41 selects the switched lower frequency of 24 GHz and executes the detection control processing in FIG. 7.

The output controller 37 outputs millimeter radio waves at a lower frequency of 24 GHz from the first and second output antennas 31 and 32.

Waves reflected by an occupant and/or an object being left in the compartment 3 are input into the first through fourth input antennas 33 through 36. The input controller 38 outputs information on the reflected waves input into the first through fourth input antennas 33 through 36 to the CPU 41.

In step ST3 in FIG. 7, the CPU 41 generates a compartment detection map 50 based on the millimeter radio waves at a low frequency of 24 GHz. In step ST4, the CPU 41 stores the generated compartment detection map 50 in the memory 42.

The CPU 41 obtains the compartment detection map 50 stored in the memory 42 in step ST33.

In step ST34, the CPU 41 analyzes the compartment detection map 50 and determines whether the child 13 or an object is being left in the luggage compartment 7 behind the back seat 6.

As in the control processing in FIG. 8, the CPU 41 may determine whether the components in the direction of the luggage compartment 7 included in the compartment detection map 50, which reflects the state in which the front seats 4 and 5 and the back seat 6 are moved forward, are those of the child 13 or an object.

In this manner, when an occupant is leaving the automobile 1, the CPU 41 switches radio waves to be output from the sensors 31 through 39 from a first radio wave of a higher frequency to a second radio wave of a frequency lower than the first radio wave. This enables the CPU 41 to determine the presence or the absence and the type of an in-vehicle object which is left in the luggage compartment 7 behind the back seat 6, based on the detection results obtained from the reflected waves detected by the sensors 31 through 39 having output the second radio wave.

If a history of a change in the state of the automobile 1 which is generated when an occupant accesses the luggage compartment 7 is recorded, the CPU 41 performs control to move forward all the seats 4 through 6 including the seat 6 in the final row in front of the luggage compartment 7, and then to output millimeter radio waves of a lower frequency from the sensors 31 through 39. Then, the CPU 41 can determine the presence or the absence and the type of an occupant being left in the luggage compartment 7 of the automobile 1, based on the detection results obtained from the reflected waves detected by the sensors 31 through 39.

If an in-vehicle object other than adults, such as the child 13 or an object, is left in the luggage compartment 7, the CPU 41 determines that an in-vehicle object is being left in the luggage compartment 7 and proceeds to step ST25. The CPU 41 outputs an alert in step ST25.

If no child 13 or no object is left in the luggage compartment 7, the CPU 41 terminates the control processing in FIG. 9 without outputting an alert.

In step ST35, the CPU 41 analyzes the in-vehicle object estimation history about the luggage compartment 7 behind the back seat 6.

As in step ST31, the CPU 41 may determine whether an in-vehicle object is present in the luggage compartment 7, based on the in-vehicle object estimation history about the luggage compartment 7.

If an in-vehicle object is likely to be present in the luggage compartment 7, the CPU 41 executes processing for confirming the presence of an in-vehicle object in the luggage compartment 7. The CPU 41 proceeds to step ST36.

If it is found that no in-vehicle object is left in the luggage compartment 7, the CPU 41 determines that no in-vehicle object is being left in the luggage compartment 7 and terminates the control processing in FIG. 9 without outputting an alert.

In step ST36, the CPU 41 performs control to move forward all the seats 4 through 6, which are positioned forward of the luggage compartment 7.

Since the front seats 4 and 5 in the first row are not moved forward in step ST27, the CPU 41 performs control to move all the seats 4 through 6 including the front seats 4 and 5 forward.

The CPU 41 instructs the seat control device 22 to move all the seats 4 through 6 in the compartment 3 forward. In response to this instruction, the seat control device 22 moves all the seats 4 through 6 until the front edge. The seat control device 22 may also perform control to fold the seatbacks of the front seats 4 and 5 and that of the back seat 6 to the frontmost position. In this case, the seat control device 22 folds the seatbacks of the front seats 4 and 5 before moving the back seat 6 forward. Then, the front seats 4 and 5 do not become obstacles for moving the back seat 6 forward and folding its seatback. As a result of moving the seats 4 through 6 forward, it can be expected that the compartment monitoring device 21 installed on the overhead console outputs millimeter radio waves toward the substantially entirety of the luggage compartment 7.

In step ST37, as in step ST28, the CPU 41 selects 24 GHz, which is the lowest frequency among the selectable frequencies of millimeter radio waves, to switch the frequency of millimeter radio waves to be output.

The CPU 41 then proceeds to step ST33 to obtain the compartment detection map 50. In step ST34, the CPU 41 analyzes the compartment detection map 50, which reflects the detection results of radio waves at a low frequency of 24 GHz selected in step ST37, and determines whether the child 13 or an object is being left in the luggage compartment 7 behind the back seat 6.

If an in-vehicle object other than adults, such as the child 13 or an object, is left in the luggage compartment 7, the CPU 41 determines that an in-vehicle object is being left in the luggage compartment 7 and proceeds to step ST25. The CPU 41 outputs an alert in step ST25.

If no child 13 or no object is left in the luggage compartment 7, the CPU 41 terminates the control processing in FIG. 9 without outputting an alert.

As described above, if it is found that no adult remains in the compartment 3 of the automobile 1, based on the detection results obtained from reflected waves generated by outputting radio waves of a higher frequency, the CPU 41 determines whether the child 13 or an object is being left in the compartment 3. When determining the presence of the child 13 or an object, the CPU 41 switches the frequency of millimeter radio waves to be output from the sensors 31 through 39 from the higher frequency to a lower frequency and then determines whether the child 13 or an object is being left in the compartment 3. If the CPU 41 has determined that the child 13 or an object is being left, it outputs an alert to an adult.

The CPU 41 also performs control to sequentially move the seats 4 through 6 in ascending order of seat rows in the front-back direction, starting from the front seats 4 and 5 of the first row. Every time each seat row is moved forward, the CPU 41 performs control to output millimeter radio waves of a lower frequency from the sensors 31 through 39 and to receive reflected waves. Then, based on the detection results obtained from the reflected waves detected by the sensors 31 through 39, the CPU 41 repeatedly determines the presence or the absence and the type of an occupant or an object being left backward of the seat that has been moved forward. Even if an in-vehicle object, such as the child 13 or an object, is present underneath the back seat 6 of the second row, for example, the CPU 41 is highly likely to detect such an in-vehicle object and determine the type of the detected in-vehicle object.

As described above, in the embodiment, the sensors 31 through 39 output millimeter radio waves toward the compartment 3 of the automobile 1 and detect waves reflected by an occupant being left in the compartment 3. In the embodiment, when outputting millimeter radio waves, the CPU 41 causes the sensors 31 through 39 to switch the frequency of radio waves between multiple frequencies including a higher frequency and a lower frequency and then to output radio waves of the switched frequency.

When an occupant in the compartment 3 is leaving the automobile 1, the CPU 41 performs control to switch the frequency of radio waves to be output from the sensors 31 through 39 from a higher frequency to a lower frequency. The CPU 41 then determines the presence or the absence and the type of an occupant being left in the compartment 3, based on the detection results obtained from the reflected waves detected by the sensors 31 through 39.

An occupant or an object being left in the back seat 6 of the second row, which is separated from the installation position of the sensors 31 through 39, may be hidden behind the front seats 4 and 5 of the first row located near the sensors 31 through 39, and it is difficult to detect such an occupant or an object in the back seat 6 with millimeter radio waves of a higher frequency. In the embodiment, with the use of millimeter radio waves of a lower frequency, such an occupant or an object in the back seat 6 is highly likely to be detected based on the reflected waves returned from the occupant or the object. Based on the detection results, the automobile 1 can suitably output an alert to the occupant leaving the automobile 1, for example.

While the embodiment has been described above, the disclosure is not restricted thereto. Various modifications and/or changes may be made without departing from the spirit and scope of the disclosure.

For example, in the above-described embodiment, to detect and determine an in-vehicle object in the seats 4 and 5 of the first row, a compartment detection map 50 based on millimeter radio waves of a higher frequency is used to determine the presence or the absence of an adult, a child 13, or an object.

Alternatively, for example, in the control processing in FIG. 9, to determine the presence or the absence of an adult, a child 13, or an object in the entire compartment 3, the CPU 41 may use a compartment detection map 50 based on millimeter radio waves of a lower frequency.

In the above-described embodiment, for the seats 4 through 6 disposed in multiple rows, the CPU 41 determines the presence or the absence of an in-vehicle object in each row in ascending order of seat rows in the front-back direction. Every time it is found that no in-vehicle object is present in a seat row, the seat in this row is moved forward and the presence of an in-vehicle object in a seat of a farther backward row is determined.

Alternatively, for example, the CPU 41 may move all the seats 4 through 6 in the compartment 3 forward together and then detect the presence of an in-vehicle object in the entire compartment 3.

In the above-described embodiment, the CPU 41 can determine that no occupant is being left in the compartment 3, based on a change in the state of the automobile 1 which is generated when an occupant is leaving the automobile 1.

The CPU 41 can generate a compartment detection map 50 including occupants in the compartment 3 of the automobile 1, based on waves reflected by various portions of the compartment 3, and determine the presence or the absence of an occupant being left in the compartment 3, based on the generated compartment detection map 50.

The CPU 41 can determine the presence or the absence of an occupant being left in the compartment 3 of the automobile 1 from multiple detection results including a detection result obtained from the reflected waves detected by the sensors 31 through 39.

The sensors 31 through 39 are disposed at the top front portion of the compartment 3 of the automobile 1 while at least facing backward. As the first radio wave, the sensors 31 through 39 can output radio waves of a frequency from which spatial resolution high enough to detect the breathing motion on the surface of the chest of an occupant being left in the compartment 3 can be obtained.

The control system 20 illustrated in FIG. 3 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control system 20 including the compartment monitoring device 21, the seat control device 22, the door opening/closing sensor 23, the wireless communication device 24, and the UI device 25. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 3.

The invention claimed is:

1. A system configured to detect an occupant remaining inside a vehicle, the system comprising:
   one or more antennas configured to:
      output a millimeter radio wave having a selected frequency toward a vehicle compartment of the vehicle; and
      detect a reflected wave generated by a reflection of the millimeter radio wave;
   a door opening/closing sensor configured to detect that a door of the vehicle is opened and closed; and
   one or more controllers coupled to the one or more antennas, the one or more controllers being configured to:
      select the selected frequency from preset frequencies, the preset frequencies including a first frequency being set at 60 GHz or higher, and a second frequency being set at 24 GHz or lower;
      cause the one or more antennas to output the millimeter radio wave having the first frequency as the selected frequency;
      switch, in response to determining that the occupant has left a driver seat of the vehicle based on information detected by the door opening/closing sensor, the selected frequency from the first frequency to the second frequency when the one or more antennas output the millimeter radio wave having the first frequency as the selected frequency to cause the one or more antennas to output the millimeter radio wave having the second frequency as the selected frequency; and
      determine whether any occupant remains inside the vehicle compartment based on the reflected wave.

2. The system according to claim 1, wherein:
   the one or more controllers are configured to switch the selected frequency from the first frequency to the second frequency after front seats in the vehicle compartment are moved toward a front of the vehicle.

3. The system according to claim 2,
   wherein the one or more controllers are configured to:
      cause, based on a first history of a state change in the vehicle occurring when one or more occupants sit in or access a back seat behind the front seats, the front seats to move toward the front of the vehicle; and
      cause the one or more antennas to output the millimeter radio wave having the second frequency after the front seats are moved toward the front of the vehicle.

4. The system according to claim 2, wherein the one or more controllers cause the one or more antennas to output the millimeter radio wave having the second frequency after all seats including the front seats in the vehicle compartment are moved toward the front of the vehicle.

5. The system according to claim 3,
   wherein the one or more controllers are configured to:
      cause, based on a second history of a state change in the vehicle occurring when one or more occupants access an area behind the back seat, the front seats and the back seat to move toward the front of the vehicle; and
      cause the one or more antennas to output the millimeter radio wave having the second frequency after the front seats and the back seat are moved toward the front of the vehicle.

6. The system according to claim 4, wherein the controller is configured to:
   each time a seat or seats in one row are moved toward the front of the vehicle, cause the one or more antennas to output the millimeter radio wave having the second frequency.

7. The system according to claim 1, wherein
   the one or more antennas and the one or more controllers are provided in the compartment monitoring device, and
   the compartment monitoring device is disposed at a front edge of a roof of the vehicle compartment and at the center position in a widthwise direction of the vehicle.

8. A system configured to detect an occupant remaining inside a vehicle, the system comprising:
   one or more antennas configured to:
      output a millimeter radio wave having a selected frequency toward a vehicle compartment of the vehicle; and
      detect a reflected wave generated by a reflection of the millimeter radio wave;
   a door opening/closing sensor configured to detect that a door of the vehicle are opened and closed; and
   circuitry configured to:
      determine that no occupants remain in any of front seats in the vehicle compartment based on the reflected wave;

select the selected frequency from preset frequencies, the preset frequencies including a first frequency being set at 60 GHz or higher, and a second frequency being set at 24 GHz or lower;

cause the one or more antennas to output the millimeter radio wave having the first frequency as the selected frequency;

switch, in response to determining that the occupant has left a driver seat of the vehicle based on information detected by the door opening/closing sensor, the selected frequency from the first frequency to the second frequency when the one or more antennas output the millimeter radio wave having the first frequency as the selected frequency to cause the one or more antennas to output the millimeter radio wave having the second frequency as the selected frequency; and determine whether any occupant remaining inside the vehicle compartment based on the reflected wave.

9. The system according to claim 3,
wherein the vehicle further includes another back seat behind the back seat,
wherein the one or more controllers are configured to:
cause, based on a second history of a state change in the vehicle occurring when one or more occupants sit in or access the another back seat, the front seats and the back seat to move toward the front of the vehicle; and cause the one or more antennas to output the millimeter radio wave having the second frequency after the front seats and the back seat are moved toward the front of the vehicle.

10. The system according to claim 9, wherein the one or more controllers are configured to:
cause, based on a third history of a state change in the vehicle occurring when one or more occupants access an area behind the another back seat, the front seats, the back seat, and the another back seat to move toward the front of the vehicle; and cause the one or more antennas to output the millimeter radio wave having the second frequency after the front seats, the back seat, and the another back seat are moved toward the front of the vehicle.

11. The system according to claim 9, wherein the one or more controllers are configured to:
cause the front seats to move toward the front of the vehicle, and after moving the front seats toward the front of the vehicle, switch the selected frequency from the first frequency to the second frequency to determine whether the occupant remains inside the vehicle compartment; and cause the back seat to move toward the front of the vehicle after moving the front seats toward the front of the vehicle, and in response to the back seat moving toward the front of the vehicle, switch the selected frequency from the first frequency to the second frequency to determine whether the occupant remain inside the vehicle compartment.

12. The system according to claim 10, wherein the one or more controllers are configured to:
cause the front seats to move toward the front of the vehicle, and after moving the front seats toward the front of the vehicle, switch the selected frequency from the first frequency to the second frequency to determine whether the occupant remains inside the vehicle compartment;

cause the back seat to move toward the front of the vehicle after moving the front seats toward the front of the vehicle, and after moving the back seat toward the front of the vehicle, cause the one or more antennas to output the millimeter radio wave having the second frequency to determine whether the occupant remains inside the vehicle compartment; and cause the another back seat to move toward the front of the vehicle after moving the back seat toward the front of the vehicle, and after moving the another back seat toward the front of the vehicle, cause the one or more antennas to output the millimeter radio wave having the second frequency to determine whether the occupant remains inside the vehicle compartment.

13. The system according to claim 8, wherein
the one or more antennas and the circuitry are provided in the compartment monitoring device, and
the compartment monitoring device is disposed at a front edge of a roof of the vehicle compartment and at the center position in a widthwise direction of the vehicle.

* * * * *